United States Patent [19]

Rowland et al.

[11] Patent Number: 5,180,647
[45] Date of Patent: Jan. 19, 1993

[54] BATTERY SEPARATOR AND METHOD OF MAKING SAME

[75] Inventors: Bob G. Rowland; George E. Monigold, Jr., both of Corvallis; Robert L. Brendle, Sweet Home; Francis V. Rosse, Corvallis, all of Oreg.

[73] Assignee: Evanite Fiber Corporation, Corvallis, Oreg.

[21] Appl. No.: 762,782

[22] Filed: Sep. 19, 1991

Related U.S. Application Data

[63] Continuation of Ser. No. 593,513, Oct. 2, 1990, abandoned, which is a continuation of Ser. No. 408,803, Sep. 18, 1989, abandoned.

[51] Int. Cl.$^5$ ............................................. H01M 2/16
[52] U.S. Cl. .................................... 429/252; 429/143; 429/144; 429/145; 429/254
[58] Field of Search ............... 429/254, 252, 143, 144, 429/145

[56] References Cited

U.S. PATENT DOCUMENTS

| | | | |
|---|---|---|---|
| 2,161,383 | 6/1939 | Reinhardt et al. | 429/254 |
| 2,526,591 | 10/1950 | Szper | 429/252 |
| 3,238,056 | 3/1966 | Pall et al. | 429/252 |
| 3,972,759 | 8/1976 | Buntin | 429/254 |
| 4,363,856 | 12/1982 | Waterhouse | 429/143 |
| 4,387,144 | 6/1983 | McCallum et al. | 429/252 |

Primary Examiner—Olik Chaudhuri
Assistant Examiner—M. Nuzzolillo
Attorney, Agent, or Firm—Klarquist, Sparkman, Campbell, Leigh & Whinston

[57] ABSTRACT

A battery separator comprises a fibrous mat which is filled with a mixture of very fine mineral powder and a binder resin. The mat may be either woven or nonwoven and the filler material generally comprises silicon materials. The binder in selected from a group of organic resinous or plastic materials, such as latex. The separator may further comprise a second attached mat of mineral or organic fibers or ribs. Further, the separator may be crimped or embossed if desired.

4 Claims, No Drawings

BATTERY SEPARATOR AND METHOD OF MAKING SAME

This application is a continuation of application Ser. No. 07/593,513, filed on Oct. 2, 1990, which was a continuation of application Ser. No. 07/408,803, filed on Sep. 18, 1989, both now abandoned.

BACKGROUND OF THE INVENTION

1. Field of the Invention

The present invention relates to battery separators and in particular, to filled fibrous battery separators for acid battery systems and methods of constructing the same.

2. Description of the Prior Art

In the construction of electrochemical storage batteries, separators are typically positioned between the positive and the negative plates in the cells of the battery to extend battery life and increase efficiency. A separator is a physical member or structure which retains the battery's electrolyte solution and provides a means for maintaining the anode plate in working chemical engagement with the cathode plate while maintaining physical separation between the plates. The separator is generally a porous membrane placed between the plates which freely permits electrolytic conduction in the cell while preventing contact between plates, which can result in shorting. It is generally desirable to employ separators with a relatively small pore size to retard the rate of active material from the battery plates penetrating into and through the separator, possibly resulting in shorting. Physical contact of the plates, which may be due to imperfections in the plate structure or due to warping or wrinkling of the plates during use, can be prevented by the interposition of a separator coextensive with the plates.

Battery separators which are commonly used today in lead acid batteries are commonly composed of phenol-aldehyde impregnated cellulose sheets, sintered polyvinyl chloride or highly-filled polyethylene. These battery separators are typically formed by preparing a mixture of fibers, a filler material and a binder and then molding or shaping the mixture into a sheet product, using techniques such as extrusion, injection molding, compression molding or processes resembling conventional papermaking. The shaping is typically performed utilizing elevated temperatures, pressure or shear force or a combination thereof.

If desired, ribs or other means may be used to add rigidity to the separator and to insure proper spacing between the plates. In addition, an electrolyte reservoir area may also be provided next to the positive plate for better conduction. Suitable ribs can be connected directly to the separator or the separator can be crimped or embossed during production to increase the spacing provided and create the reservoir.

Battery separators manufactured by W. R. Grace & Co. under the designations Darak 2000 and 5000 have utilized nonwoven webs which were filled with thermosetting resins (such as phenolics) and silica to make rigid leaf separators. The manufacturing process required that the resin be advanced in nondrying condition and then dried in order to retain the porous structure of the resin. The separator also included extruded ribs made from the same phenolic-silica mixture.

A separator manufactured by Standard Electric under the designation "Permalife" used latex and diatomaceous earth to fill and coat a special thick fiberglass sheet for use as heavy leaf separators. Other separators, such as those manufactured by U.S. Rubber and Amerace, were manufactured using a polymer-silica mixture, such as PVC-silica or hard rubber-silica.

There are many disadvantages to these prior separators. First, the separators are relatively thick with high electrical resistance, which limits their range of applications. This is especially true with the polymer-silica separators which often use high levels of polymer to increase mechanical strength, usually resulting in excessive electrical resistances. If relatively high levels of polymer are not used, the separators may have low mechanical strength, making them unfit for many applications. Second, phenolic binders have a tendency to make the separators brittle and incapable of being folded or enveloped around a plate for some applications. Third, phenolic binders often require special drying and curing conditions resulting in higher manufacturing costs.

It is an object of the present invention to provide a battery separator which overcomes the disadvantages of the prior battery separators.

It is also an object of the present invention to provide a battery separator which can be easily constructed out of readily purchasable fiber sheets rather than requiring specially-developed processes and machinery.

It is also an object of the present invention to provide a method of manufacturing battery separators which do not require specialized manufacturing conditions.

It is a further object of the present invention to provide a battery separator to which ribs can be easily attached, or can be crimped or embossed into a desired configuration.

SUMMARY OF THE INVENTION

The present invention is directed to a battery separator comprising a fibrous mat which is filled with a mixture of very fine mineral powder and a binder resin. The mat may be either woven or nonwoven and the filler material generally comprises silicon materials. The binder is selected from a group of organic resinous or plastic materials, such as latex. The separator may further comprise a second attached mat of mineral or organic fibers or ribs. Further, the separator may be crimped or embossed if desired.

DETAILED DESCRIPTION OF THE PREFERRED EMBODIMENTS

The desirable characteristics of battery separators are a certain degree of rigidity, inertness, porosity, impermeability to particles of solid material and lack of contamination of the electrolyte solution. The battery separator should also be electrically insulative and should possess certain chemical properties such as resistance to the electrolyte and the nascent oxygen generated on the positive plate during discharge.

The method and materials described below have been used to produce a full range of separators used in virtually all types of batteries, including automotive, stationary power, traction and sealed recombinant batteries.

The separator of the present invention comprises a fibrous mat, which may be either woven or nonwoven, although nonwoven is preferred due to lower costs. The mat may be made from materials such as fiberglass, polyester, polypropylene, polyethylene, ceramics and the like. The preferred weight basis for the mat is between 1 and 8 grams per square foot, although heavier mats may be used for separators where low separator electrical resistance is not critical. The thickness of the mat may be between 0.005 and 0.050 inches. Fiber deniers of 0.5 to 10.0 are preferred, but other sizes may also be used.

The mat may be purchased from any of several suppliers or made by a variety of manufacturing processes, including spunbond, air laid, wet laid, melt blowing or weaving, using either adhesives or thermal bonding techniques. The preferred method of producing the mat is to make a spunbonded polyester web by extruding filaments, stretching the filaments with air as they exit the extrusion die and casting the filaments into a web on a moving belt. The thickness of the finished mat and degree of fiber to fiber bonding may be controlled by heat and pressure on the web.

In accordance with the present invention, the preferred mat is a polyester spunbonded mat with a weight of 1 oz./square yard at 0.010 inches thickness. Fibers of 2 to 4 denier are preferred.

A filler is applied to the mat to provide a microporous structure within the fibrous mat of the separator. The pores of the mat are generally large compared to the pores of the filler.

Generally, fillers may be any material which is substantially inert with respect to the electrolyte to which it is to come in contact. When the battery separator is used as a component of an acid battery system, the filler material may include silicon compounds, such as silicon oxide, silica gels, polysilicates and the like.

In accordance with the present invention, the preferred fillers are silicas that have a particle size of between 1 to 25 microns. Silicas which have been used successfully include those sold by PPG under the designation Hysil SBG and by Degussa under the designation 22-LS. These silica particles have an agglomerate size which averages between 4 and 12 microns and surface area of between 170 and 180 square meters per gram. Other minerals and some organics can also be used as fillers, such as diatomaceous earths, some clays, calcium carbonate and wood flour. Particles sizes outside of the preferred range can also be used for some applications, as can mixtures of particles within and outside of the preferred range.

The binder is used to hold the filler together and adhere it to the mat. The binder must be sufficiently acid- and oxidation-resistant to continue these functions during the life of the battery. In accordance with the present invention, the binder can be any of several organic resinous or plastic materials, with the preferred binder being latex. Lattices of polyacrylates (Acrylic), polystyreneacrylates (STYACR), styrene butadiene rubbers (SBR) and polyvinylidine chloride (PVDC) have all been used with success. Preferred binders include those sold by Unocal Chemical Company as #2131 Acrylic and #4120 SBR. Mixtures of the above binders can also be used.

The ratio of filler to binder can vary widely, depending on the choice of fibrous mat, filler and binder. The type of service the battery is expected to encounter also affects this ratio. Typically, the weight ratio will be between 1 part binder to 1 part filler and 1 part binder to 10 parts filler. Heavy-duty service and high strength requirements would indicate the lower filler to binder ratios. It has been determined that under normal conditions a minimum ratio of latex binder to silica is 1:7; the maximum practical ratio of latex binder to silica is 1:2; and the preferred ratio of binder to silica is 1:5.

It has been found that the high silica loading renders the separator self-wetting to battery acid. The speed and degree of wetting depends on the ratio of binder, type of binder, thickness of the mat and other factors. The wetting factor and some processing factors may require some additional materials in the filler mixture, including wetting agents, thickeners, catalysts and accelerators. When a wetting agent is required, American Cyanamid Co.'s Aerosol MA has been found to give good results.

When a thickener is required, a thickener such as an acrylic sold by Rohm & Haas Co. under the designation ASE-60, will provide good results. It has been found that a solution of 14 percent aqueous ammonia will tend to activate this thickener. A thickener designated as Alcogum L-11 and sold by Alco Chemical Co., has also given good results, although colloids must sometimes be added to activate the thickener. In some applications, no thickener is required.

If desired, ribs may be attached to the mat either before or after filling to impart additional strength to the separator. The preferred ribs are hot extruded high-density polypropylene, although other rib materials could include polyvinyl chloride, polyethylene, polyester and polystyrene. The ribs may contain from 0 to 60 weight per cent fillers such as talc, silica, clay or calcium carbonate. Polyvinyl chloride plastisols may also be used for the ribs.

The separator may also be crimped or embossed as desired to create a reservoir for the electrolyte solution. The separator sheet may be crimped or embossed into a variety of patterns either before or after drying using standard techniques.

PROCESS FOR MAKING BATTERY SEPARATORS

To make a battery separator in accordance with the present invention, a desired filler mixture is prepared in a suitable blending means. In general, the filler mixture will include a silicon filler material, a binder resin, water, wetting agents and any necessary processing aids, such as foam and viscosity control agents. An antifoam agent sold by Dow Chemical Co. under the designation D-10 has given good results.

The filler mixture will typically have the consistency of a thin paste. The viscosity of the filler mixture and the percentage of solids will depend on the chosen filler, the mat and the specifications of the desired finished separator. Preferably, the filler mixture will have a viscosity of approximately 1000 to 5000 centipoise. Some organic solvents may be present in the filler mixture if certain binder resins, such as polystyrene solutions are used.

The filler mixture is then applied to the mat, such as by using a conventional roll coater. The coater meters the proper amount of the filler mixture and forces it into the mat. It is sometimes preferred to fill the mat from one side, leaving a fibrous surface for the attachment of ribs, a secondary mat, or both. The mat must be well-filled to provide a microporous structure which is relatively free of pinholes through which undesired particles could pass. A variety of other known coating machines and/or saturators may also be used to fill the mat, such as blades, rollers, curtain coaters, sprayers, dippers and the like.

The wet mat is then dried and cured using conventional methods, such as heated ovens, belts, rolls, infra-red devices, steam or hot air. Normally, the mat is brought to temperatures above 250° F. for good bonding by the latex. For some applications, multiple mat filling and drying steps are performed to create the desired separator.

After the mat has been filled and dried, it can be slit or cut to a desired width, wound on storage devices and used as flat separator material in the construction of batteries. In addition, the mat may be ribbed by any of several methods known to the industry, such as by hot extrusion of filled or unfilled polyethylenes, polypropylenes, polyvinyl chloride or polyester. Ribs and/or embossing may also be applied to the web before the filling and drying steps, or between filling and drying steps. The mat may also have a secondary retainer-type mat attached, with or without the ribs. The resulting battery separator is suitable for enveloping battery plates using common enveloping machines. The battery separator may also be cut to size and used as leaf separators.

EXAMPLES 1-4

In Examples 1-4, battery separators were made using a spunbonded web material formed of polyester fiber with the following characteristics: weight of 3.2±0.3 grams; fiber denier of 4; and a mat thickness of 0.010 inches. This web was made by Reemay Incorporated and sold under the designation #2014. Various filler mixtures were formulated as shown in TABLE I, and the characteristics of the finished battery separators are shown in TABLE II.

TABLE I

| Example No. | 1 | 2 | 3 | 4 |
|---|---|---|---|---|
| Code No. | E-1 | E-10 | E-13 | E-14 |
| Formulation: | | | | |
| Unocal Latex No. | 2131 | 9143 | 701 | 1015 |
| Polymer Type | Acrylic | SBR | PVDC | STYACR |
| Latex Nonvolatiles, g. | 25 | 37 | 34 | 34 |
| Water, g. | 25 | 30 | 30 | 30 |
| Hysil SBG Silica, g. | 150 | 150 | 150 | 150 |
| Water, g. | 600 | 570 | 570 | 570 |
| Thickener (R & H ASE-60), g. | 25 | 3 | 4.4 | 3 |
| AntiFoam (Dow H-10), g. | — | 1.5 | 1.5 | 1.5 |
| Aqueous Ammonia 14%, g. | 3 | 1.2 | 10.8 | 8.7 |

TABLE II

| Example No. | 1 | 2 | 3 | 4 |
|---|---|---|---|---|
| Thickness, mils | 10 | 7.0 | 8.3 | 9.0 |
| Basis weight, gsf | 7.9 | 5.2 | 6.6 | 7.7 |
| Filler weight, gsf | 5.4 | 2.7 | 4.1 | 5.2 |
| Max. pore diameter, micr | 55 | 53 | — | — |
| Wetting time, sec. | 10.9 | 11.0 | 5.0 | 9.7 |
| 2 Hr. Elect. Resistance (ohms-in$^2$) × 1000 | 4.0 | 3.7 | 3.9 | 5.2 |
| Frazier porosity | 1.36 | 1.26 | <0.57 | <0.57 |
| 3-Day Punct. Strength, g. | 737 | 633 | 727 | 750 |
| 10-Day Punct. Str., g. | 737 | 657 | 723 | 643 |

Treated with Aerosol-MA wetting agent solution (⅓%)
Puncture strength in grams after 3 days in hot acid (160° F.)
Puncture strength in grams after 10 days in hot acid (160° F.)

EXAMPLE 5

In Example 5, a battery separator was made using a spunbonded web material formed of polyester fiber with the same characteristics as used in Examples 1-4, above. The filler mixture was formulated as shown in TABLE III and the characteristics of the finished battery separator are shown in TABLE IV.

TABLE III

| Example No. | 5 |
|---|---|
| Code No. | RUN 8 |
| Formulation: | |
| Unocal Latex No. | 4120 |
| Polymer Type | SBR |
| Latex Nonvolatiles, g. | 42 |
| Water, g. | 42 |
| Hysil SBG Silica, g. | 140 |
| Water, g. | 400 |
| Antifoam (Dow H-10), g. | 3 |
| Colloids , g. | 0.1 |
| Thickener (Alcogum L-11), g. | 3 |
| Ex. Cure, min/°F. | 5/340 |

Used to activate the Alcogum Thickener

TABLE IV

| Thickness, mils | 12.5 |
|---|---|
| Basis weight, gsf | 14.6 |
| Filler weight, gsf | 11.6 |
| Max. pore dia, microns | 37 |
| App. Vol Porosity, % | 69.1 |
| Elec. Resist. w/o Wetting Agt, (ohms-in$^2$) × 1000 | |
| 20 min. | 70.3 |
| 3 hours | 34.7 |
| 6 hours | 23.3 |
| 24 hours | 16.5 |
| 48 hours | 13.7 |
| Frazier porosity | 1.38 |
| Pin puncture, oz./mil | 3.8 |

Of the above examples, the separator of Example No. 1 was the most desirable overall. However, all of the separators of Examples 1-5 were suitable for use as a separator in an automotive battery. They all were flexible and capable of being folded into envelope form and had the other desirable characteristics enumerated previously.

Although preferred embodiments of the present invention have been shown, it is obvious than many modifications and variations of the present invention are possible in light of the above teachings. It is therefore to be understood that the present invention may be practiced otherwise than as specifically described.

What is claimed is:

1. A method for manufacturing a separator for use in an electrolytic storage battery, comprising the steps:
   (a) providing a fibrous mat;
   (b) providing a liquid polymeric binder;
   (c) providing a particulate filler;
   (d) suspending the filler in the liquid binder to form a liquid filler mixture;
   (e) applying the filler mixture to the fibrous mat to form a filled mat;
   (f) providing a rib-forming material;
   (g) applying the rib-forming material to a surface of the mat so as to form at least one rib of the rib-forming material on said surface: and
   (h) drying the filled mat.

2. A method as recited in claim 1 including the step of partially drying the filled mat before applying the rib-forming material to the mat.

3. A method for manufacturing a separator for use in an electrolytic storage battery, comprising the steps:
   providing a fibrous mat;
   providing a liquid impregnant mixture comprising a suspension of a particulate filler material in a curable liquid polymeric binder;

applying the impregnant mixture to the fibrous mat to form a filled mat;
providing a liquid rib-forming material;
applying the rib-forming material to a surface of the filled mat so as to form at least one rib of the rib-forming material adhered to said surface: and
drying the filled mat, thereby producing a ribbed separator.

4. A method for manufacturing a separator for use in an electrolytic storage battery, comprising the steps:
   (a) providing a fibrous mat;
   (b) providing a liquid polymeric binder;
   (c) providing a particulate filler;
   (d) suspending the filler in the liquid binder to form a liquid filler mixture;
   (e) applying the filler mixture to the fibrous mat to form a filled mat;
   (f) applying at least one rib to a surface of the filled mat, the rib comprising a liquid curable rib-forming material; and
   (g) drying the filled mat.

* * * * *

UNITED STATES PATENT AND TRADEMARK OFFICE
CERTIFICATE OF CORRECTION

PATENT NO. : 5,180,647
DATED : January 19, 1993
INVENTOR(S) : ROWLAND ET AL.

It is certified that error appears in the above-indentified patent and that said Letters Patent is hereby corrected as shown below:

Column 5, lines 46-59, to add footnote designations, please replace Table II with the following Table II:

--TABLE II

| Example No. | 1 | 2 | 3 | 4 |
|---|---|---|---|---|
| Thickness, mils | 10 | 7.0 | 8.3 | 9.0 |
| Basis weight, gsf | 7.9 | 5.2 | 6.6 | 7.7 |
| Filler weight, gsf | 5.4 | 2.7 | 4.1 | 5.2 |
| Max. pore diameter, micr | 55 | 53 | — | — |
| Wetting time, sec. | 10.9 | 11.0 | 5.0 | 9.7 |
| 2 Hr. Elect. Resistance (ohms-in$^2$) × 1000[†] | 4.0 | 3.7 | 3.9 | 5.2 |
| Frazier porosity | 1.36 | 1.26 | <0.57 | <0.57 |
| 3-Day Punct. Strength, g.[††] | 737 | 633 | 727 | 750 |
| 10-Day Punct. Str., g.[†††] | 737 | 657 | 723 | 643 |

[†] Treated with Aerosol-MA wetting agent solution (½%)

[††] Puncture strength in grams after 3 days in hot acid (160°F.)

[†††] Puncture strength in grams after 10 days in hot acid (160°F.)--

UNITED STATES PATENT AND TRADEMARK OFFICE
CERTIFICATE OF CORRECTION

PATENT NO. : 5,180,647
DATED : January 19, 1993
INVENTOR(S) : ROWLAND ET AL.

It is certified that error appears in the above-indentified patent and that said Letters Patent is hereby corrected as shown below:

Column 6, lines 1-14, to add footnote designations, please replace Table III with the following Table III:

--TABLE III

| Example No. Code No. | 5 RUN 8 |
|---|---|
| Formulation: | |
| Unocal Latex No. | 4120 |
| Polymer Type | SBR |
| Latex Nonvolatiles, g. | 42 |
| Water, g. | 42 |
| Hysil SBG Silica, g. | 140 |
| Water, g. | 400 |
| Antifoam (Dow H-10), g. | 3 |
| Colloids†, g. | 0.1 |
| Thickener (Alcogum L-11), g. | 3 |
| Ex. Cure, min/°F. | 5/340 |

† Used to activate the Alcogum Thickener--

Signed and Sealed this

Thirteenth Day of September, 1994

Attest:

*Attesting Officer*

BRUCE LEHMAN

*Commissioner of Patents and Trademarks*